E. W. GORSUCH.
RAIL JOINT.
APPLICATION FILED MAY 27, 1908.
927,650.
Patented July 13, 1909.
3 SHEETS—SHEET 1.
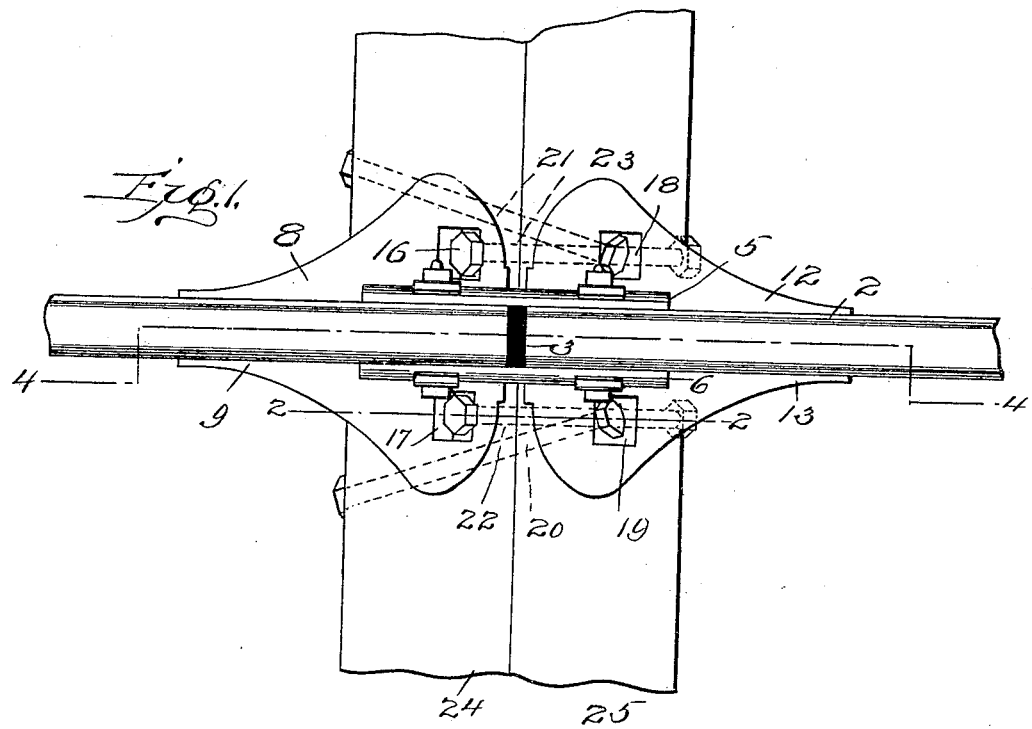
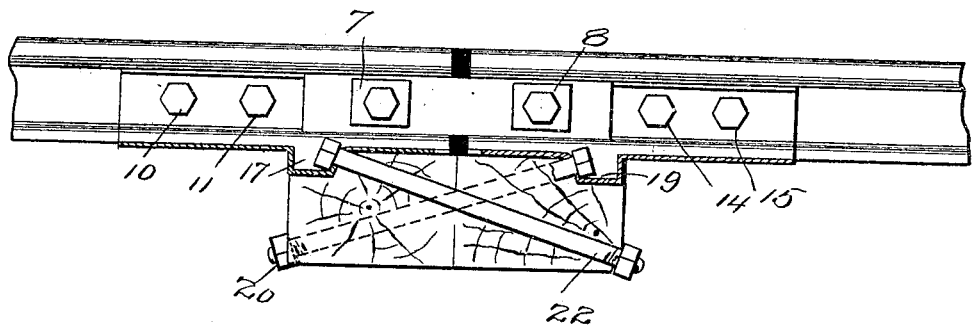

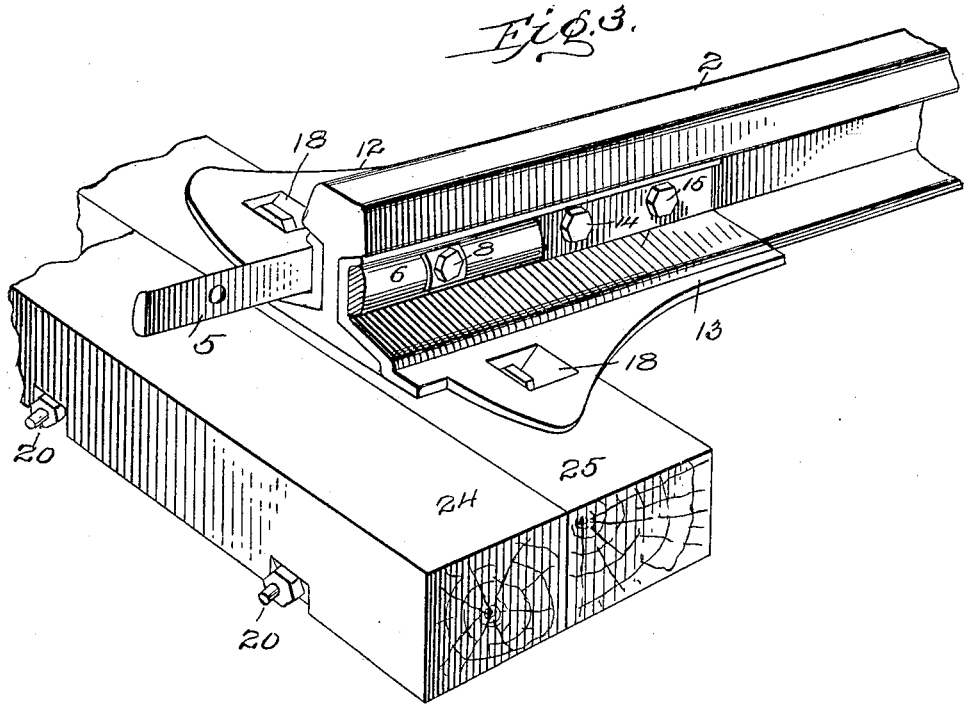
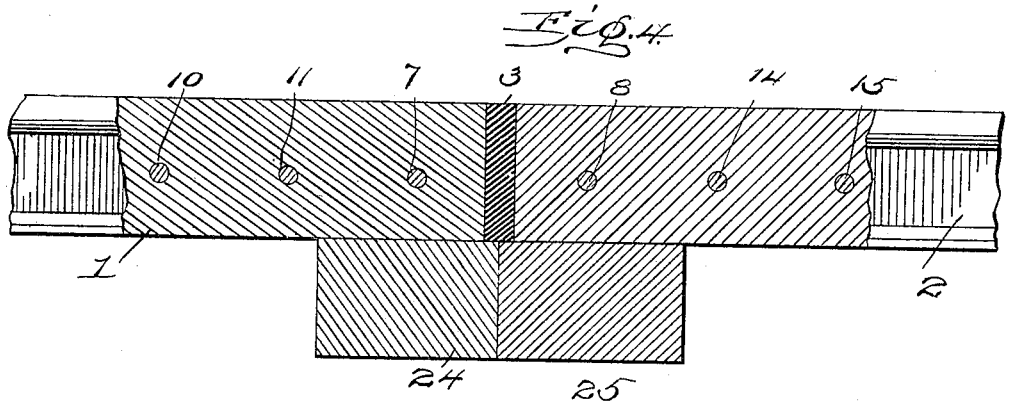

E. W. GORSUCH.
RAIL JOINT.
APPLICATION FILED MAY 27, 1908.
927,650.
Patented July 13, 1909.
3 SHEETS—SHEET 3.
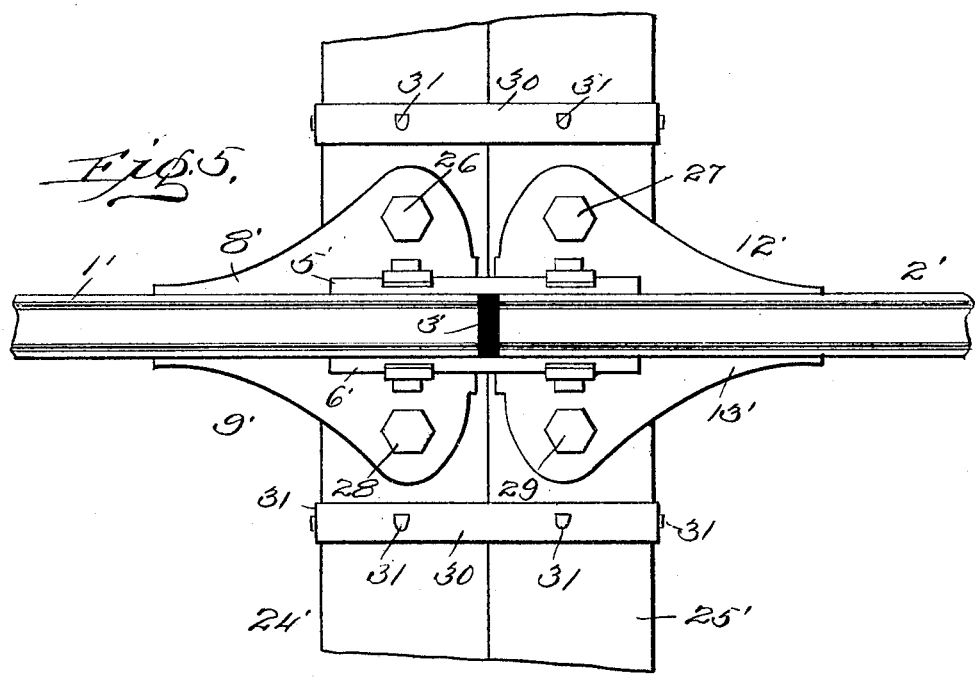
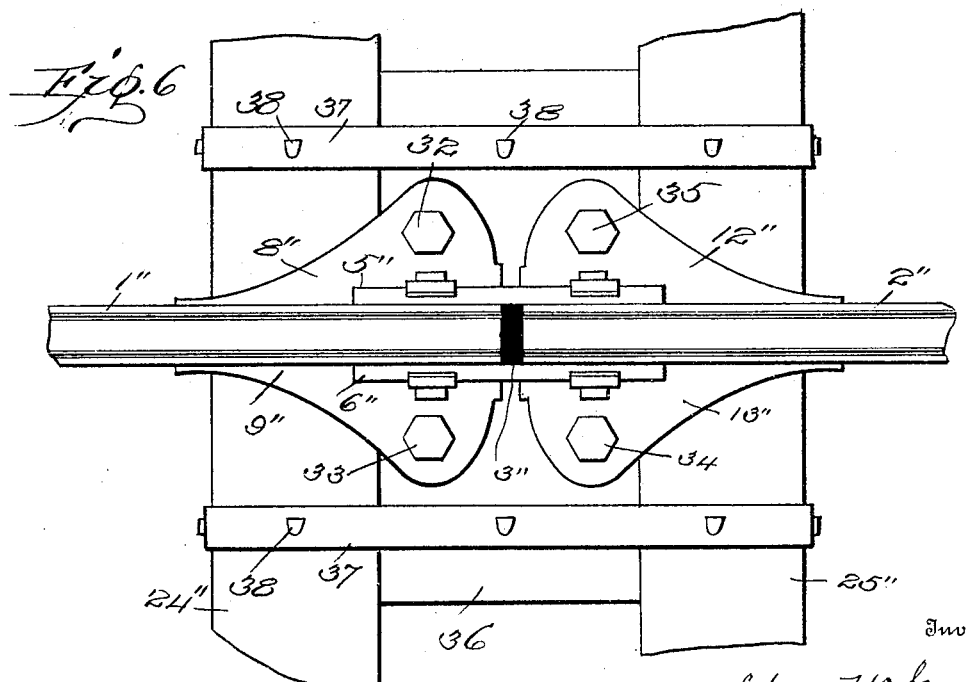
Witnesses
J. M. Fowler Jr.
A. L. Kitchin
Inventor
Edwin W. Gorsuch
By Mason Fenwick & Lawrence
Attorneys

UNITED STATES PATENT OFFICE.

EDWIN W. GORSUCH, OF BALTIMORE, MARYLAND.

RAIL-JOINT.

No. 927,650.  Specification of Letters Patent.  Patented July 13, 1909.

Application filed May 27, 1908. Serial No. 435,268.

*To all whom it may concern:*

Be it known that I, EDWIN W. GORSUCH, a citizen of the United States, residing at Baltimore city, State of Maryland, have invented certain new and useful Improvements in Rail-Joints; and I do hereby declare the following to be a full, clear, and exact description of the invention, such as will enable others skilled in the art to which it appertains to make and use the same.

This invention relates to improvements in rail joints, and particularly to insulated joints, and has for an object the provision of insulation placed between the abutting ends of rails, and means for holding the rails in juxtaposition.

Another object in view is the provision of an insulated joint comprising insulation positioned between the abutting ends of rails, fish plates secured to the rails, and means for holding the fish plates in position.

A still further object of the invention is the provision of an insulated joint arranged with diagonally positioned bolts arranged to hold the abutting ends of rails together and to resist any creeping action of the rail.

With these and other objects in view, the invention comprises certain novel constructions, combinations, and arrangements of parts as will be hereinafter more fully described and claimed.

In the accompanying drawings: Figure 1 is a top plan view of a joint formed according to the present invention. Fig. 2 is a section through Fig. 1 approximately on line 2—2. Fig. 3 is a perspective view of one-half of the joint shown in Fig. 1, the insulation being removed. Fig. 4 is a section through Fig. 1 on line 4—4. Fig. 5 is a top plan view of a slightly modified form of the structure shown in Fig. 1. Fig. 6 is a top plan view of a further modified form of the structure shown in Fig. 1.

Referring to the drawing by numerals, 1 and 2 indicate rails of any desired structure having their ends slightly spaced in order to accommodate an insulating block 3 which may be of any desired insulating material, as rubber or fiber. Insulating block 3 is preferably made to fit tightly between the abutting ends of rails 1 and 2, and is held in place by bracing members 5 and 6, which are constructed of wood, though other insulating means may be used. The bracing members 5 and 6 are securely held in position by means of bolts 7 and 8 that pass through the respective rails 1 and 2. Ordinarily the bolts 7 and 8 are adapted to fit the holes in the rails 1 and 2 through which they pass, as clearly seen in Fig. 4, though if desired elongated holes might be provided in order not to bring any strain upon the bracing bars 5 and 6 caused by the contraction and expansion of the respective rails.

Bolted to rail 1 are plates, commonly known as fish plates, 8 and 9 by bolts 10 and 11. A bolt 7 also passes through the fish plates 8 and 9. A pair of fish plates 12 and 13 are bolted to rail 2 by bolts 14 and 15, together with bolt 8 as more clearly seen in Fig. 3. As will be evident, bolts 7 and 8 are not adapted to act as holding means for the respective fish plates, but only as retaining means for the bracing means 5 and 6, though, as will be evident, they will exert a small tendency toward binding the fish plates in position against the respective rails. The fish plates 8, 9, 12 and 13 are formed with depressed portions 16, 17, 18 and 19 respectively, and are adapted to accommodate the heads of bolts 20, 21, 22 and 23. The abutting ends of rails 1 and 2, and the respective fish plates, may rest upon a single tie or a plurality of ties as 24 and 25. In either event bolts 20 and 21 are adapted to firmly hold the fish plates 12 and 13 in position upon the tie, and the fish plates in turn will hold the rail 2 in position. As clearly seen in the drawing, the bolts 20 and 21 are adapted to be positioned so as to give a longitudinal pull against rail 2. Bolts 22 and 23 are adapted to hold fish plates 8 and 9 in position and to give a longitudinal pulling or retaining strain upon rail 1 for holding the same in position in order that the end of the same may be held in proximity to the end of the rail 2. By this construction and arrangement the abutting ends of rails 1 and 2 are held properly in position, and yet are not brought into electrical communication with each other, as insulation 3 will prevent current from passing at that point, and bracing members 5 and 6 will prevent current from passing therethrough, as the same are made from wood or other insulating means. Bolts 20, 21, 22 and 23 are all arranged to pass through the wooden ties 24 and 25 and to not contact with each other, as clearly seen in Fig. 1 where it will be observed that bolts 20 and 21 are inclined outwardly, while bolts 22 and 23 are positioned in a substantially parallel plane with the rails. By this construction it will not only be observed that current cannot pass one way or the other, but that the insulating means, as rubber or fiber 3, is positioned between the abutting ends of the rails, and no insulation, except the wooden ties, 24 and 25, is positioned below the rails. This arrangement presents a structure that is adapted to wear for the same length of time as the ordinary joint, because there is nothing beneath the rails to wear out and no insulating sleeves or other device upon which strain is brought.

In Fig. 5 I have shown a slightly modified form of means holding the rails together and the various parts in their correct position. Referring more particularly to this figure, 1' and 2' indicate rails and 3' the block of insulation positioned between the abutting ends of the rails. The insulation 3' and bracing members 5' and 6' are similar to the preferred form, and also the various fish plates 8', 9', 12' and 13'. Bolts 26, 27, 28 and 29 respectively pass through the respective fish plates, and also through ties 24' and 25'. The bolts are adapted to firmly hold the fish plates in position and the fish plates which are firmly bolted to the rails 1' and 2', similar to the structure shown in Fig. 1, hold the rails in position. In order to positively prevent ties 24' and 25' from separating a strap 30 is passed partially around the ties or entirely around the ties if desired, and is secured thereto by any desired means as pins 31. Any desired number of straps 30 may be used, but usually one on each side of the joint is sufficient.

In Fig. 6 is shown a still further modified form of coupling means in which rails 1'' and 2'' are held in place by fish plates 8'', 9'', 12'' and 13'', the fish plates being secured to the respective rails by bolts in the same manner as set forth in regard to the preferred construction. Positioned between the abutting ends of the rails 1'' and 2'' is an insulating block 3'' held in place by bracing members 5'' and 6''. The respective fish plates are firmly bolted in position by bolts 32, 33, 34 and 35 to a block 36. The block 36 preferably is extended but a short distance on each side of the rails 1'' and 2'' and is held in place by straps 37—37 which are in turn rigidly secured to ties 24'' and 25'', and also block 36 by means of pins 38—38. The straps 37—37 may be passed only partially around the ties and block 36 or entirely around the same as may be desired, and are preferably only two in number, one on each side of the respective rails being usually sufficient. By this construction and arrangement, and also by the construction and arrangement shown in Fig. 5 the ends of the respective rails are firmly held in position against lateral and longitudinal movement, and also thoroughly insulated from each other. The braces 5' and 6' in Fig. 5, and the bracing members 5'' and 6'' in Fig. 6 are made from wood or other insulating material as set forth in the preferred construction, which, taken with the respective insulating blocks, placed between the abutting ends of the rails, positively prevents any current from passing from one rail to the other. The respective ties, and also block 36 both in the modified construction and in the preferred form must be made from wood or other non-conductor so that none of the fastening means may convey current from one rail to the other. In these two modifications the bolts are positioned substantially vertical, and in this manner obviates the necessity of positioning the same at various angles as shown in the preferred construction.

What I claim is:

1. In a rail joint, the combination with the abutting ends of rails, of a tie for supporting said rails, an insulating block positioned between said abutting ends, a pair of fish plates for each of said abutting ends, means for securing said fish plates to said rails, and a securing bolt for each of said fish plates passing diagonally through said tie, two of said securing bolts being flared outwardly and two extending in a plane parallel with said rails.

2. In a rail joint, the combination with the abutting ends of rails, of a tie for supporting said rails, an insulating block positioned between the ends of said rails, a pair of fish plates for each rail, a pair of wooden strips holding said insulating block in position, means for holding said wooden strips in position, means for securing said fish plates to said rail, a depressed lug projecting from each of said fish plates, and securing means passing through said depressed lug and through said tie substantially longitudinally of said rail for holding said fish plates in position and said rail from creeping.

3. In a rail joint, the combination with the abutting ends of rails, of a plurality of fish plates secured to each of said rails, a plurality of means for holding said plates in position, means for holding the plates of one of said rails in position being positioned at an angle in respect to the means for holding the plates of the other rail said means consisting of a bolt extending entirely through said tie and having mounted on the end thereof means for locking the bolt in place, an insulating block positioned between the abutting ends of said rails, and a non-conductor secured to said rails for holding said insulating block in position.

4. In a rail joint, the combination with the abutting ends of rails, of an insulating block positioned between said rails, a tie for supporting the ends of said rails, a pair of independent fish plates for each of said rails, each pair of fish plates being separated from the other, a securing means for each of said fish plates passing diagonally through said tie with securing means engaging the lower edge of said tie for holding the respective securing means in position, and means for holding in position the insulating block positioned between said rails.

5. In a rail joint, the combination with the abutting ends of rails, a tie for supporting said rails, an insulating block positioned between said rails, means for holding said insulating block in position, a pair of independent fish plates for each of said rails, means for clamping said fish plates to their respective rails, each of said fish plates being formed with a pressed out portion for receiving a securing means, and a bolt for each of said fish plates engaging said pressed out portion of the fish plates and passing diagonally through said tie, said bolt being provided with locking and clamping means at its lower end for holding said bolt in position.

In testimony whereof I affix my signature in presence of two witnesses.

EDWIN W. GORSUCH.

Witnesses:
ALBERT G. WALKER,
GRANVILLE MANSBERGER.